United States Patent

Saito et al.

Patent Number: 5,761,582
Date of Patent: Jun. 2, 1998

[54] OPTICAL ADJUSTMENT DEVICE FOR AN IMAGE FORMING APPARATUS

[75] Inventors: Taku Saito; Toshiaki Tomino; Tetsu Sekine, all of Hachioji, Japan

[73] Assignee: Konica Corporation, Japan

[21] Appl. No.: 725,233

[22] Filed: Oct. 3, 1996

[30] Foreign Application Priority Data

Oct. 6, 1995 [JP] Japan ................... 7-260206

[51] Int. Cl.$^6$ ................................. G03G 15/30
[52] U.S. Cl. ................... 399/216; 355/60; 355/66; 399/51
[58] Field of Search .................. 399/51, 177, 216, 399/218, 193, 201, 202, 32; 355/67, 60, 66

[56] References Cited

U.S. PATENT DOCUMENTS

| | | | |
|---|---|---|---|
| 3,740,137 | 6/1973 | Sato | 355/66 |
| 4,457,616 | 7/1984 | Tokuhara | 399/201 |
| 4,800,413 | 1/1989 | Ito et al. | 399/216 X |
| 4,919,499 | 4/1990 | Aiba | 399/216 X |

*Primary Examiner*—S. Lee
*Attorney, Agent, or Firm*—Jordan B. Bierman; Bierman, Muserlian and Lucas

[57] ABSTRACT

In a device for adjusting an optical system arranged in such that a scanning mirror is moved in a direction perpendicular to a main scanning line so as to reflect a line-shaped image light line by line, a first V-mirror is moved in synchronization with the scanning mirror and changes a direction of the line-shaped image light reflected from the scanning mirror toward a lens, a second V-mirror changes a direction of the line shaped image light coming from the lens toward a guide mirror, and a guide mirror projects the line-shaped image light onto a photoreceptor, the device includes a mechanism to change positions of at least two of the first V-mirror, the second V-mirror and the guide mirror so as to place the line-shaped image light at a predetermined position on the photoreceptor; and a mechanism to regulate a tilting angle of the guide mirror so as to make an incident angle of the line-shaped image light on the photoreceptor to a predetermined angle.

12 Claims, 17 Drawing Sheets

OPTICAL ADJUSTMENT DEVICE FOR AN IMAGE FORMING APPARATUS

BACKGROUND OF THE INVENTION

The present invention relates to an optical adjustment method and a device for use in an image forming apparatus such as a copying machine and its optical adjustment apparatus.

For example, a copying machine is provided with an original loading stand (a platen), a long and narrow slit in the primary scanning direction, a first mirror (a scanning mirror) which moves integrally with aforesaid slit in the secondary scanning direction, a first angled mirrors (a first V-mirror) which moves slower compared to aforesaid first mirror wherein two reflected surface for re-reflecting reflected beam from the first mirror cross approximately perpendicularly, a lens for image-forming a reflected light from aforesaid angled mirror, the second angled mirror (a second V-mirror) which re-reflects beam emited from aforesaid lens and a guide mirror which re-reflects the reflected light from aforesaid second angled mirror and guides it to the image carrier, and an image of the original loaded on the original loading stand is caused to be image-formed on the image carrier.

In the above-mentioned copying machine, due to manufacturing errors and installation errors of the first angled mirror, the second angled mirror and the guide mirror, a line parallel to the primary scanning direction on the original loading surface and a line parallel to the secondary scanning direction may not be image-formed at an intended exposure position on the image carrier, causing distortion or position shifting.

Accordingly, it is necessary that a line parallel to the primary scanning direction on the original loading surface and a line parallel to the secondary scanning direction are respectively (1) image-formed on an intended position, as (2) a line parallel to the primary scanning direction and (3) a line parallel to the secondary scanning direction.

According to prior art, however, movement mechanisms of the angled mirror perpendicular to the original loading surface were not provided. Or, even if it was provided, it was provided on either of the first angled mirror or the second angled mirror.

In addition, with regard to the guide mirror, there was nothing which provide mechanical degree of motion other than rotation.

Accordingly, among three factors to be adjusted, i.e., when a line parallel to the primary scanning direction on the original loading surface and a line perpendicular to aforesaid line are (1) image-formed on a intended position on the image carrier, (2) as a parallel line on the image carrier, or (3) as a perpendicular line on the image carrier, at least one factor remained un-adjusted, or adjustment was conducted averaging three adjustment As described above, there was no appropriate adjusting method. Though the problems were countered somewhat by improvement in terms of manufacturing accuracy and installation accuracy, at least one element was not modified and aforesaid three elements were averaged. Therefore, it was difficult to adjust correctly distortion or position shifting.

SUMMARY OF THE INVENTION

The present invention was made to counter the above-mentioned problems. With a simple constitution, distortion of image-formation or position shifting can be correctly adjusted so that favorable image having high reproducibility is obtained. Specifically, an optical system adjustment method wherein image quality at a position separated from the optical axis of lens and an optical adjustment device for a copying machine can be provided.

In order to overcome the above-mentioned problems, the optical system adjustment method of the image forming apparatus of the present invention comprises an original loading stand, an image carrier, the first mirror which moves in the secondary scanning direction, the first angled mirrors which moves slower compared to the first mirror, wherein two reflected surface of the first angled mirrors for re-entering a reflected light from the first mirror are constructed approximately perpendicular each other, the first angled mirrors can be turned around one end portion thereof or its vicinity as a fulcrum in the primary scanning direction so that the other end portion can be moved by an actuator approximately perpendicular direction to the above-mentioned original loading surface, a lens for focusing a reflected light from the first angled mirrors so as to form an image, the second angled mirrors which re-reflects beam emitted from aforesaid lens wherein the second angled mirrors can be turned by an actuator around one end portion thereof or its vicinity in the primary scanning direction in the same side of the above-mentioned first angled mirror as a fulcrum so that the other end is movable to approximately perpendicular direction to the above-mentioned original loading surface and the guide mirror which re-reflects beam from the second angled mirror, guides it to the above-mentioned image carrier and is capable of rotating around an axis parallel to the primary scanning direction as its center in the reflected surface, one end of the above-mentioned angled mirrors and one end of the second angled mirror are caused to move in approximately perpendicular direction to the original loading surface so that a line image parallel to the primary scanning direction is adjusted. Next, a line image parallel to the secondary scanning direction is adjusted by rotating the above-mentioned guide mirror. Position shifting of the line image parallel to the primary scanning direction, which occurs due to the rotation adjustment of aforesaid guide mirror is adjusted by moving the one end of the above-mentioned first angled mirrors and the one end of the second angled mirrors in approximately perpendicular direction to the above-mentioned original loading surface. Accordingly, the line image parallel to the primary scanning direction on the original loading surface and the line image parallel to the secondary scanning direction on the original loading surface are respectively formed as a line parallel to the primary scanning direction and a line parallel to the secondary scanning direction on a intended exposure position on the above-mentioned image carrier.

An optical system adjustment device of the image forming device of the present invention comprises an original loading stand, an image carrier, the first mirror which moves in the secondary scanning direction, the first angled mirrors which moves at a slower speed than the first mirror in which two, reflection surface for re-reflecting a reflected beam from the above-mentioned first mirror are approximately perpendicular each other, a lens for image-forming a reflected beam from aforesaid angled mirrors, the second angled mirror constituted in such a manner that a beam emited from aforesaid lens is re-reflected and the guide mirror which re-reflects a beam from the second angled mirrors for introducing in the above-mentioned image carrier and rotatable with the axis parallel to the primary scanning direction in the reflected surface as the center, wherein the above-mentioned first angled mirrors is rotatable around one end in the primary scanning direction or its vicinity thereof as a fulcrum so that the other end thereof can be moved in approximately perpendicular direction to the original loading stand, the above-mentioned second angled mirror is rotatable around one end in the primary scanning direction or in the vicinity thereof on the same side with the above-mentioned first angled mirrors as a fulcrum so that the other end is movable in approximately perpendicular direction to the above-mentioned original loading surface and a line image parallel to the primary scanning direction on the original loading surface and a line image parallel to the secondary scanning direction on the original loading surface are respectively formed on the intended exposure position on the above-mentioned image carrier as a line parallel to the primary scanning direction and a line parallel to the secondary scanning direction due to the combination of the movement of one end of the above-mentioned first angled mirrors and one end of the above-mentioned second angled mirrors approximately perpendicular to the above-mentioned original loading surface and rotation of the above-mentioned guide mirror.

As described above, according to the above-mentioned invention, by moving one end of the first angled mirror and one end of the second angled mirror approximately perpendicular to the original loading surface against the original loading surface, a line parallel to the primary scanning direction is adjusted. Next, by rotating the guide mirror, a line parallel to the secondary scanning direction is adjusted. Position shifting of a line parallel to the primary scanning direction which occurs due to adjustment by rotation of aforesaid guide mirror is adjusted by moving one end of the first angled mirrors and one end of second angled mirrors in approximately vertical direction, and a line parallel to the primary scanning direction o the original loading surface and a line parallel to the secondary scanning direction on the original loading surface are respectively caused to image-form on a intended exposure position on the above-mentioned image carrier as a line parallel to the primary scanning direction and a line parallel to the secondary scanning direction. Accordingly, with a simple constitution, distortion of image-formation and position shifting can be correctly adjusted.

Namely, even though there is no position shifting (in other words, no distortion) at an image-formation position on an image carrier related to the forward/backward direction (secondary scanning direction) of the apparatus, depending upon the combination of two angled mirrors, in the case of a drum-shaped image carrier, the extended line of the emited light from the guide mirror may not pass the central axis. In addition, in the case of a belt-shaped image carrier, the emited light does not enter perpendicularly to the image carrier. In such an occasion, specifically in the vicinity of the end portion of the image carrier, a line perpendicular to the primary scanning direction is obliquely image-formed so that image quality deteriorates. Accordingly, by means of the combination of adjusting the height of two angled mirrors and adjustment of the guide mirror. As a result, favorable image having high reproducibility is obtained. Specifically, image quality at a position separated from the optical axis is improved.

An optical adjustment method of the image forming device of the present invention comprises an original loading stand, an image carrier, the first mirror which moves in the secondary scanning direction, the first angled mirrors which moves at slower speed compared to aforesaid first mirror wherein two reflection mirror for re-reflect reflected beam from the above-mentioned first mirror are approximately perpendicular each other, a lens for image-forming a reflected light from the first angled mirror, the second angled mirror wherein two reflection mirror for re-reflect reflected beam from aforesaid lens are approximately perpendicular each other and the guide mirror which re-reflects a beam from the second angled mirror for introducing it to the above-mentioned carrier. At least one of the above-mentioned two angled mirrors is rotatable with one end thereof or in the vicinity thereof as the center. The other end portion is movable approximately perpendicular direction to the above-mentioned original loading surface, the above-mentioned guide mirror is rotatable with a line is rotatable with a line parallel to the primary scanning direction in its reflected surface as the center, it is movable while keeping the parallelity of the central axis of aforesaid rotation in the primary scanning direction, a line parallel to the primary scanning direction on the original loading surface is caused to image-form as a line parallel in the primary scanning direction on the image carrier by moving the other end of the above-mentioned angled mirror approximately perpendicular to the original loading surface. A line perpendicular to the primary scanning direction on the original loading surface is caused to image-form perpendicular to the primary scanning direction on the image carrier by rotation of the above-mentioned guide mirror and parallel movement of aforesaid rotation central axis. Concurrently with this, a line parallel to the primary scanning direction on the above-mentioned original loading surface is caused to image-format a intended position on the image carrier.

An optical adjustment method of the image forming device of the present invention comprises an original loading stand, an image carrier, the first mirror which moves in the secondary scanning direction, the first angled mirrors which moves at slower speed compared to aforesaid first mirror wherein two reflection mirror for re-reflect reflected beam from the above-mentioned first mirror are approximately perpendicular each other, a lens for image-forming a reflected light from the first angled mirror, the second angled mirror wherein two reflection mirror for re-reflect reflected beam from aforesaid lens are approximately perpendicular each other and the guide mirror which re-reflects a beam from the second angled mirror for introducing it to the above-mentioned carrier, wherein at least one of the above-mentioned two angled mirrors is rotatable with one end thereof or in the vicinity thereof as the center. The other end portion is movable approximately perpendicular direction to the above-mentioned original loading surface, the above-mentioned guide mirror is rotatable with a line is rotatable with a line parallel to the primary scanning direction in its reflected surface as the center, it is movable while keeping the parallelness of the central axis of aforesaid rotation in the primary scanning direction.

As described above, according to the above-mentioned invention, by moving the other end of the angled mirror approximately perpendicular to the original loading surface, a line parallel to the primary scanning direction on the original loading surface is caused to image-form as a line parallel to the primary scanning direction on the image carrier. Due to the rotation of the guide mirror and parallel movement of aforesaid rotation central axis, a line perpendicular to the primary scanning direction on the original loading surface is caused to image-form as a line perpendicular to the primary scanning direction on the image carrier. Concurrently with this, a line parallel to the primary scanning direction on the original loading surface is caused to image-form at a intended position on the image carrier. Accordingly, with a simple constitution, distortion of image-formation and position shifting can be correctly adjusted.

Namely, even though there is no position shifting (in other words, distortion) at an image-formation position on an image carrier related to the forward/backward direction (secondary scanning direction) of the apparatus, depending upon the combination of two angled mirrors, in the case of a drum-shaped image carrier, the extended line of the emited light from the guide mirror may not pass the central axis. In addition, in the case of a belt-shaped image carrier, the emited light does not enter perpendicularly to the image carrier. In such an occasion, specifically in the vicinity of the end portion of the image carrier, a line perpendicular to the primary scanning direction is obliquely image-formed so that image quality deteriorates. Accordingly, by means of the combination of adjusting the height of two angled mirrors and adjustment of the guide mirror. As a result, favorable image having high reproducibility is obtained. Specifically, image quality at a position separated from the optical axis is improved.

DETAILED DESCRIPTION OF THE PREFERRED EMBODIMENT

Hereinafter, an optical adjustment method in an image forming apparatus and an optical system adjustment apparatus in aforesaid image forming apparatus of the present invention will now be explained in detail.

Figure 1:
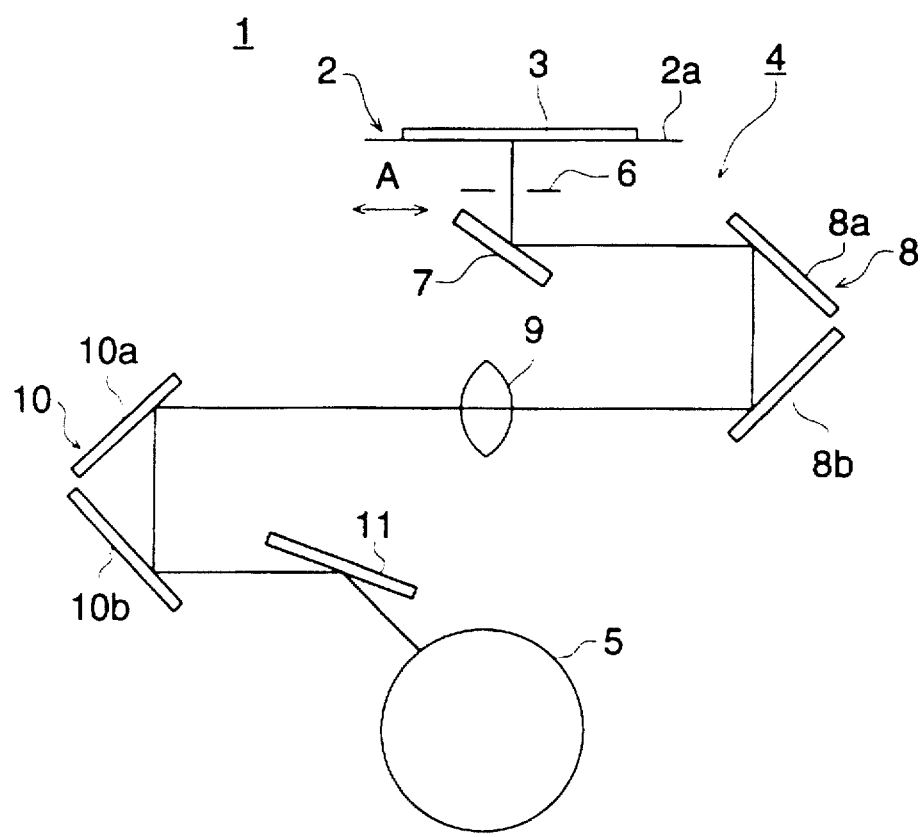
FIG. 1 is a schematic block diagram of the optical system of an image forming apparatus.

The first example of the present invention will be explained referring to FIGS. 1 through 9. FIG. 1 represents an optical schematic block diagram of the image forming apparatus.

As an image forming apparatus, copying machine 1 image-forms an image of original 3 on original loading surface 2a of original loading stand 2 on image carrier 5 by means of optical system 4. Optical system 4 is provided with long and narrow slit in the primary scanning direction, first mirror 7 which integrally moves with the above-mentioned slit 6 in the secondary scanning direction, angled mirror 8 which moves slower than the above-mentioned first mirror 7, i.e. ½ speed, wherein two reflected surfaces for re-reflecting a reflection light from above-mentioned first mirror 7 are approximately perpendicular each other, lens 9 for image-forming reflected light from the above-mentioned first angled mirror 8, second angled mirror 10 for re-reflecting beam reflected from the above-mentioned lens 9 and guide mirror 11 which re-reflects reflected light from the above-mentioned second angled mirror 10 and guides it into image carrier 5 so that an image on original 3 loaded on original loading stand 2 is subsequently image-formed on image carrier 5.

Namely, when scanning the original, the first mirror 7 moves to the secondary scanning direction shown by arrow A together with slit 6. The first angled mirror 8 moves at ½ speed of the first mirror 7, in the same direction to the first mirror 7, and then, re-reflects a reflected light from the first mirror 7, wherein aforesaid angled mirror 8, composed of two sheets of reflected mirrors 8a and 8b which are formed at approximately 90° each other. Lens 9 image-forms reflected light from the first angled mirror 8 on image carrier 5. The second angled mirror 10 moves in an optical axis direction when converting magnification and is used for re-reflecting light beam incidenced from lens 9, wherein aforesaid second angled mirror 10 is composed of two sheets of reflected mirrors 10a and 10b which are formed at approximately 90° each other. Guide mirror 11 guides beam from second angled mirror 10 onto image carrier 5.

Figure 2:
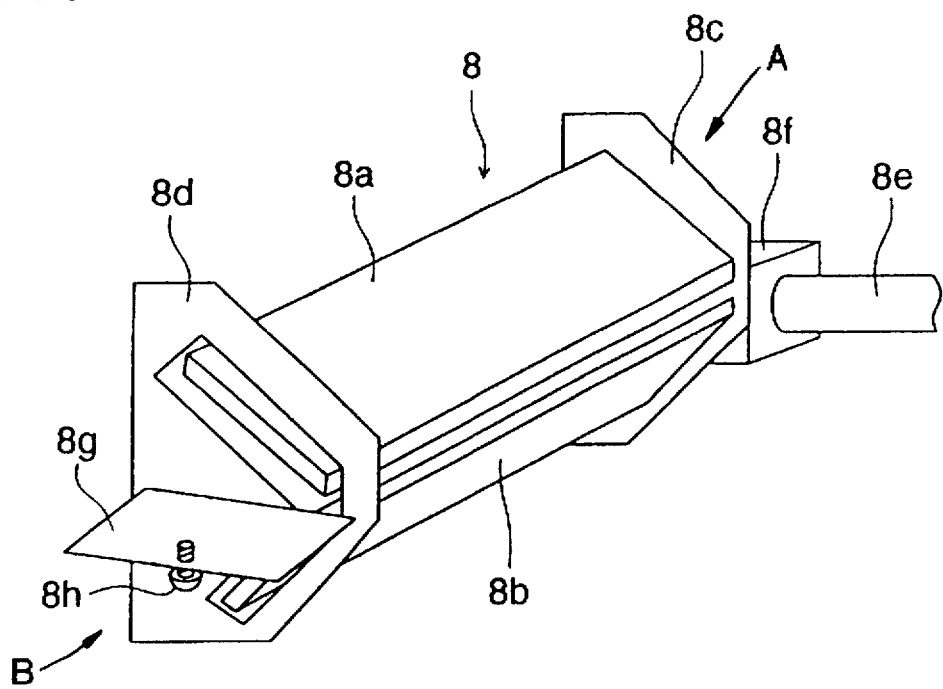
FIG. 2 is a block diagram of the first angled mirrors.

FIG. 2 is a block diagram of the first angled mirror. Two reflected mirrors 8a and 8b which are formed at approximately 90° in first angled mirror 8 are secured by paired side plates 8c and 8d. Side plate 8c is supported by first moving member 8f which moves on moving shaft 8e together with scanning of the original. On side plate 8d, adjusting mechanism 8g is mounted approximately perpendicular to the original loading surface. Adjusting screw 8h of adjusting mechanism 8g moves on a parallel plane with moving shaft 8e not illustrated. By tightening or loosening this adjusting screw 8h, first angled mirror 8 can be rotated with moving shaft 8e as its center. The first angled mirror 8 is constituted variably approximately perpendicular to the original loading surface at the B side, while being rotatable with the other end thereof or in the vicinity thereof in terms of the primary scanning direction in relation to the optical axis as a fulcrum.

Figure 3:
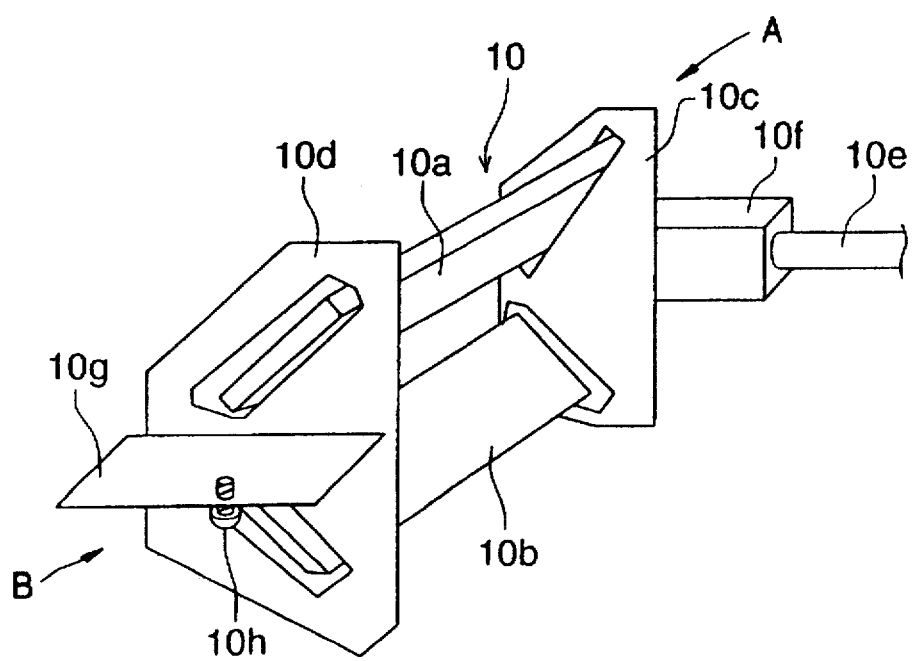
FIG. 3 is a block diagram of the second angled mirrors.

FIG. 3 is a block diagram of the second angled mirror. Two reflected mirrors 10a and 10b which forms approximately 90° each other in second angled mirror 10 are secured by paired side plates 10c and 10d. Side plate 10c is supported by second moving member 10f which moves on moving shaft 10e together with scanning of the original. On side plate 10d, adjusting mechanism 10g is mounted approximately perpendicular to the original loading surface. Adjusting screw 10h of adjusting mechanism 10g moves on a parallel plane with moving shaft 10e not illustrated. By tightening or loosening this adjusting screw 10h, second angled mirror 10 can be rotated with moving shaft 10e as its center. The second angled mirror 10 is constituted variably approximately perpendicular to the original loading surface at the B side, while being rotatable with the other end thereof or in the vicinity thereof in terms of the primary scanning direction related to optical axis as a fulcrum.

Figure 4:
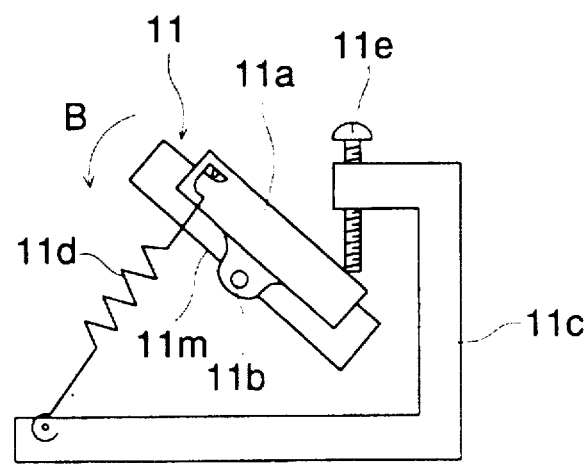
FIG. 4 is a drawing showing a constitution of the guide mirror composition.
Figure 5:
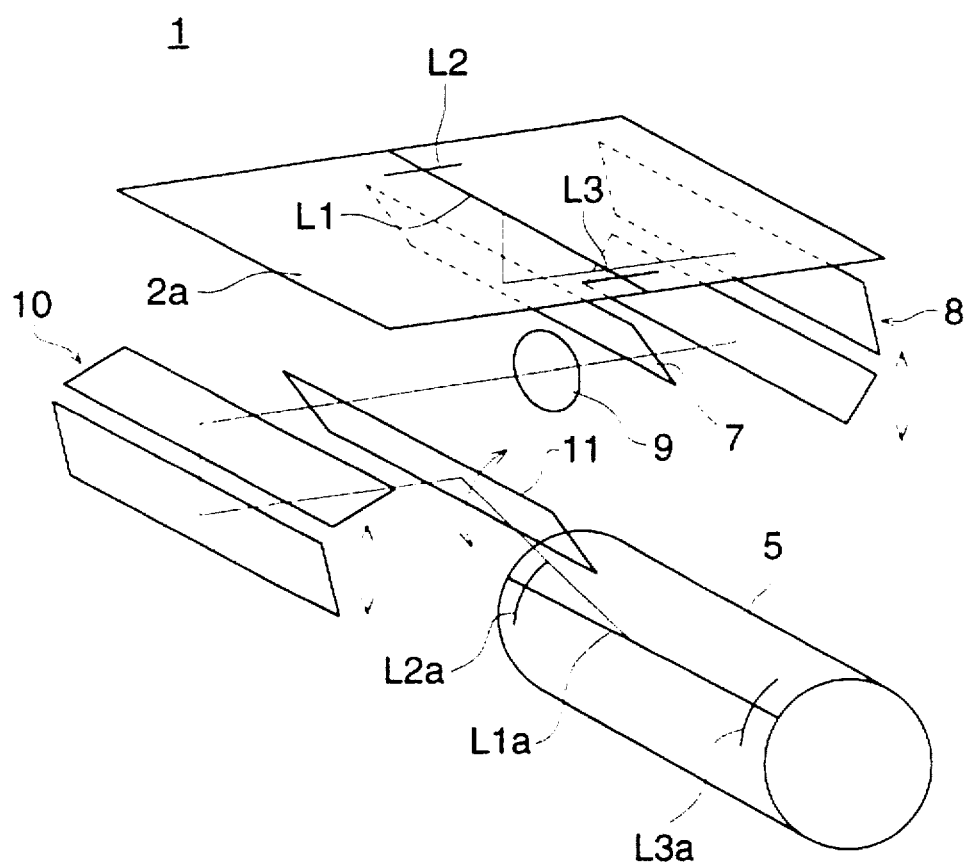
FIG. 5 is a perspective view showing an optical adjustment of the image forming apparatus.

FIG. 4 is a drawing showing a constitution of the guide mirror composition. Guide mirror 11 is supported by mirror securing member 11a. Aforesaid mirror securing member 11a is located inside reflected surface 11m of guide mirror 11, and is always biased in the arrowed direction B by spring 11d provided on mirror stand 11c, with rotation center 11b which is a line parallel to the primary scanning direction as the center. By tightening or loosening adjusting screw 11e provided on mirror stand 11c, guide mirror 11 rotates with rotation center 11b as the center for changing incidence angle to image carrier 5.

The procedure of optical adjustment of copying machine 1 will now be explained referring to FIGS. 5 through 9.

Optical adjustment of copying machine 1 is conducted by adjustment of one end of the above-mentioned first angled mirror 8 in the vertical direction, adjustment of one end of the second angled mirror 10 in the vertical direction and adjustment due to rotation of guide mirror 11, by checking one line L1 which is parallel to the primary scanning direction and which is drawn approximately at the center of slit in terms of slit width direction and two lines L2 and L3 which are parallel to the secondary scanning direction and which are drawn at both ends of slit are image-formed on image carrier 5.

In copying machine 1, due to manufacturing error or mounting error of first angled mirror 8, second angled mirror 10 and guide mirror 11, L1 which is parallel to the primary scanning direction on original loading surface 2a and L2 which are parallel to the secondary scanning direction may not be image-formed at the intended light exposure position on image carrier 5, causing distortion or position shifting. In such occasions, if image-formation condition of three lines L1, L2 and L3 are observed, FIG. 6(a) may be assumed.

Figure 6A:
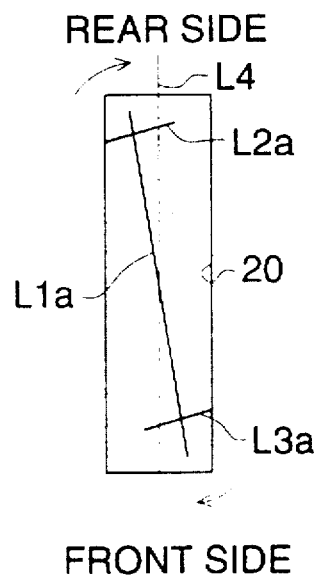
FIGS. 6(a) to 6(e) are drawings showing procedure of an optical adjustment of the image forming apparatus.
Figure 6B:
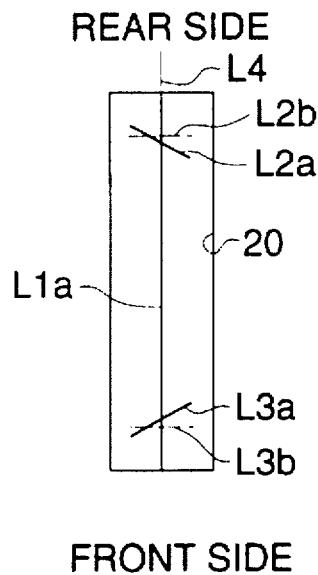

First, the following position adjustment in the primary scanning direction will be conducted: By changing one end of first angled mirror 8 to approximately perpendicular to original loading surface 2a, the rear side of image L1a of line L1 which is parallel to the primary scanning direction. By changing one end of second angled mirror 10 to approximately perpendicular to original loading surface 2a, the front side of image L1a of line L1 parallel to the primary scanning direction is adjusted. Image L1a of line L1, parallel to the primary scanning direction, is to be aligned to line L4, which is the central line of slit frame 20 as shown in FIG. 6(b), to which the image must be formed originally.

Next, the image formation condition of L2 and L3 which are lines parallel to the secondary scanning direction will be observed. As shown in FIG. 6(b), line L1 in the primary scanning direction is positioned on image L4 of line which should originally be image-formed of the central line L1 in the primary scanning direction. However, if line L1 is image-formed as actual lines L2a and L3a which are not parallel to the secondary scanning direction on original loading surface 2a as lines L2b or L3b which are parallel to the secondary scanning direction, adjustment must be made in such as manner that both lines become almost parallel as shown in FIG. 6(c) by rotation of guide mirror 11.

Figure 7:
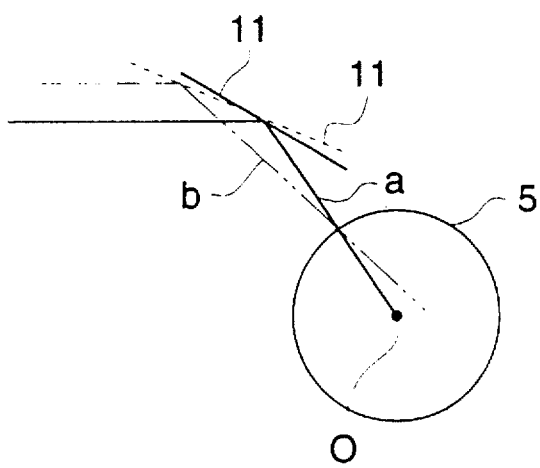
FIGS. 7(a) and 7(b) are drawings explaining a reason that a line which should initially be parallel does not become parallel.
Figure 7:
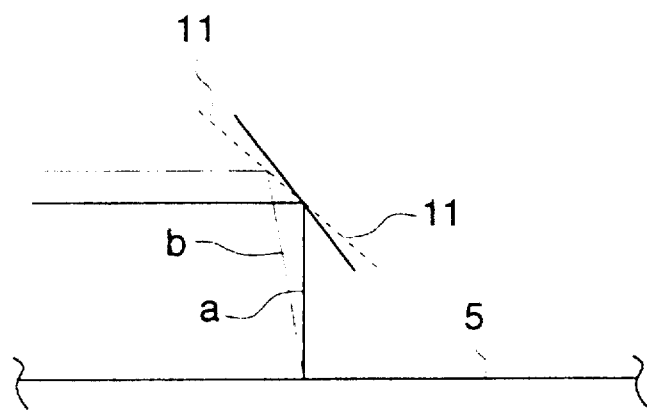

Here, the reason why lines which should originally be parallel, but are not parallel will now be explained, referring to FIG. 7. When image carrier 5 is cylindrical as shown in FIG. 7(a), extended line a of an optical axis beam reflected from guide mirror 11 passes through center O of the aforesaid cylinder, if there is no error in position and angle of the reflected mirror. However, if there is an error in position and angle of the reflected mirror, aforesaid extended line b may not pass center O of the circle. In this occasion, the difference in terms of optical path occurs related to the circumferential direction of the light exposure section on image carrier 5, resulting in difference in magnification. Practically, since image forming points are shifted between the first and the end of exposure following scanning of the original, resulting in that a point does not become a point.

In addition, when image carrier 5 is a plane at an image-forming point as shown in FIG. 7(b), if there is no error in position and angle of the reflected mirror, beam a reflected by guide mirror 11 enters perpendicular to a plane of image carrier 5. However, if there is an error in position and angle of the reflected mirror, this entering beam b is not perpendicular to plane of image carrier 5 so that problems in the same manner as in the case of cylindrical image carrier 5 occur.

Figure 6C:
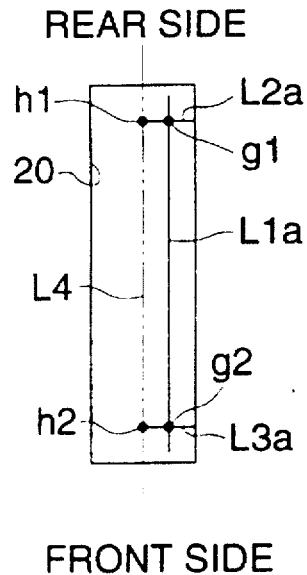

If adjustment by guide mirror 11 is conducted, as shown in FIG. 6(c), image L1a of line L1 which is parallel to the primary scanning direction drawn on original loading surface 2 causes shifting against image L4 of line which should originally be image-formed on. image carrier 5.

Figure 6D:
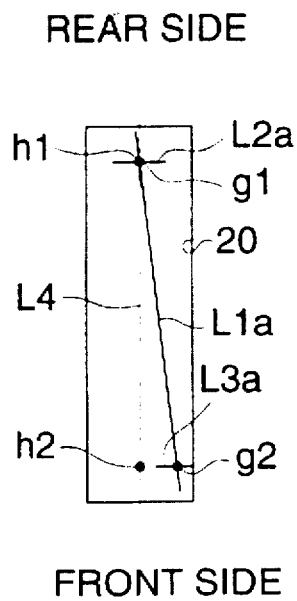
Figure 6E:
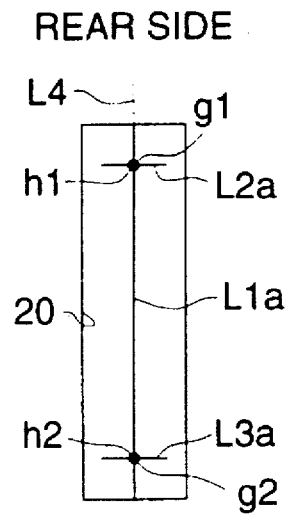

When there is an adjustment mechanism for vertical direction of first angled mirrors 8 in front of an apparatus, as shown in FIG. 6(d), due to adjustment for vertical direction of first angled mirrors 8, intersection point g1 for image L1a of line L1 which is parallel to the primary scanning direction and image L2a which is parallel to the secondary scanning direction is caused to move to intersection point h1 of image L4 of a line which should originally be image-formed and image L2a of line L2 which is parallel to the secondary scanning direction. Here, since there is lens 9 between first angled mirrors 8 and image carrier 5, image of intersection point g1 which is located on the opposite side in terms of optical axis by moving the adjustment mechanism located in front of the apparatus.

Figure 8:
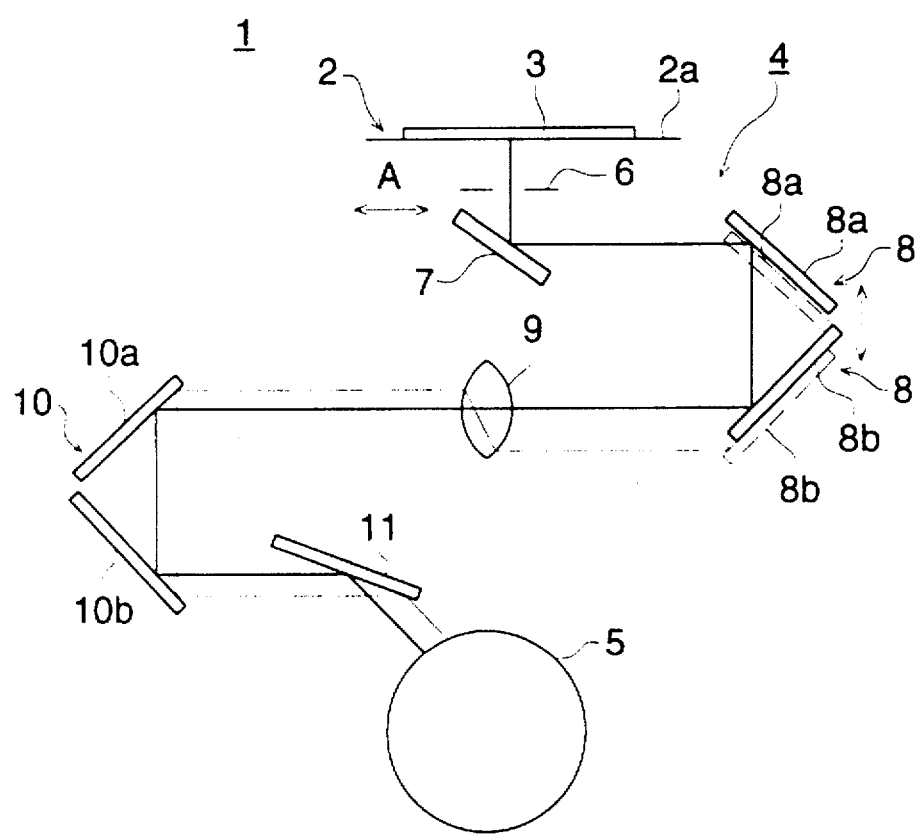
FIG. 8 is a drawing explaining a structure that an intersection point moves due to an adjustment mechanism of the first angled mirrors.

In addition, a structure in which intersection point g1 moves due to adjustment mechanism of first angled mirrors 8 is shown in FIG. 8. If first angled mirrors 8 is moved approximately in the vertical direction, an image-forming point on image carrier 5 moves. Here, moving in the vertical direction only occurs on one side of the apparatus having the adjustment mechanism. Therefore, movement of image due to adjustment of first angled mirrors 8 occurs only on intersection point g1.

Image L1Ia of straight line L1 in which an image is formed as shown in FIG. 6(d) and which is parallel to the primary scanning direction is not parallel to image L4 of the straight line which should originally be image-formed. Therefore, by means of an adjustment mechanism, for approximately vertical direction of second angled mirrors 10, which is located in front side of the apparatus, intersection point g2 of image L1a of straight line L1 which is parallel to the primary scanning direction and image L3 of straight line L3 which is parallel to the secondary scanning direction is caused to move to intersection point h2 of image L4 of straight line which should originally be image-formed and image L3a of straight line L3 which is parallel to the secondary scanning direction. Here, since lens 9 is not provided between second angled mirrors 10 and image carrier 5, due to moving the adjustment mechanism located in front of the apparatus, intersection point g2 which is located on the same side as optical axis moves.

Figure 9:
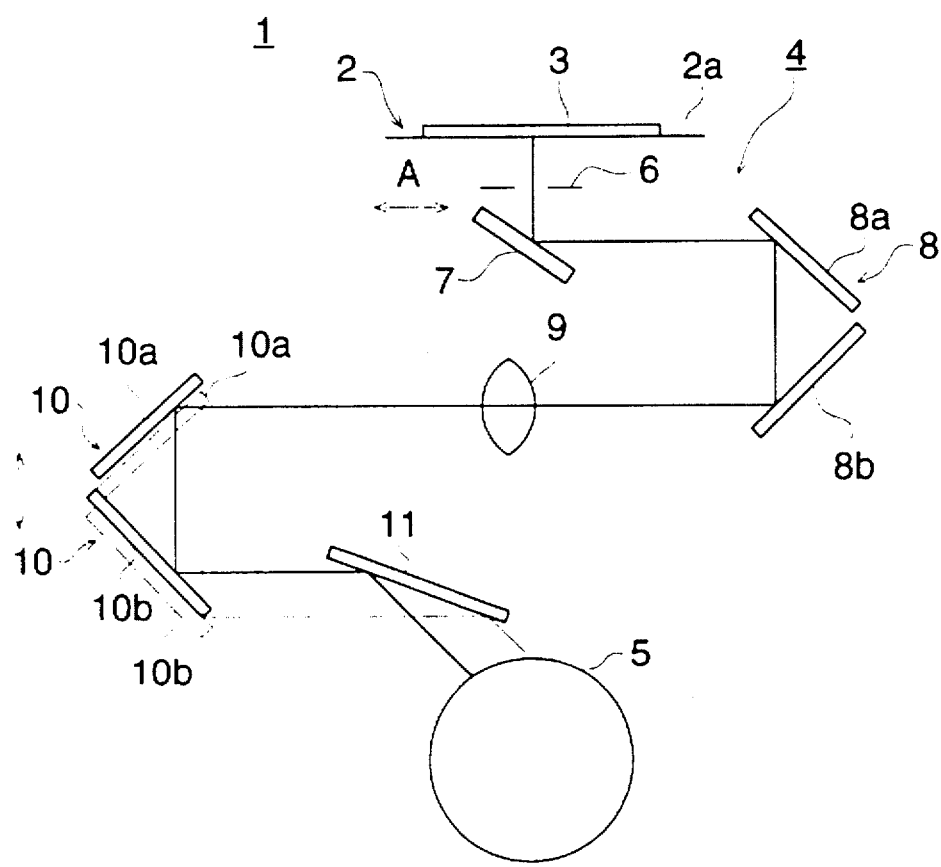
FIG. 9 is a drawing explaining a structure that an intersection point moves due to an adjustment mechanism of the second angled mirrors.

FIG. 9 shows a structure in which intersection point g2 moves due to the adjustment mechanism for second angled mirrors 10. If second angled mirrors 10 is moved approximately in the vertical direction, an image-forming point on image carrier 5 moves. Here, movement of second angled mirrors 10 in an approximately vertical direction occurs only on one side in which there is an adjustment mechanism. Accordingly, movement of an image due to adjustment of second angled mirrors 10 only occurs at intersection point g2. By repeating a series of adjustment procedures, straight line L1 parallel to the main scanning direction and straight lines L2 and L3 which are parallel to the secondary scanning direction crossing perpendicularly with L1 on original loading surface 2a can be image-formed on image carrier 5 as image L1a of a straight line almost parallel to the intended position, and L2a and L3a of a straight line which almost crosses perpendicular to L1a.

Figure 10:
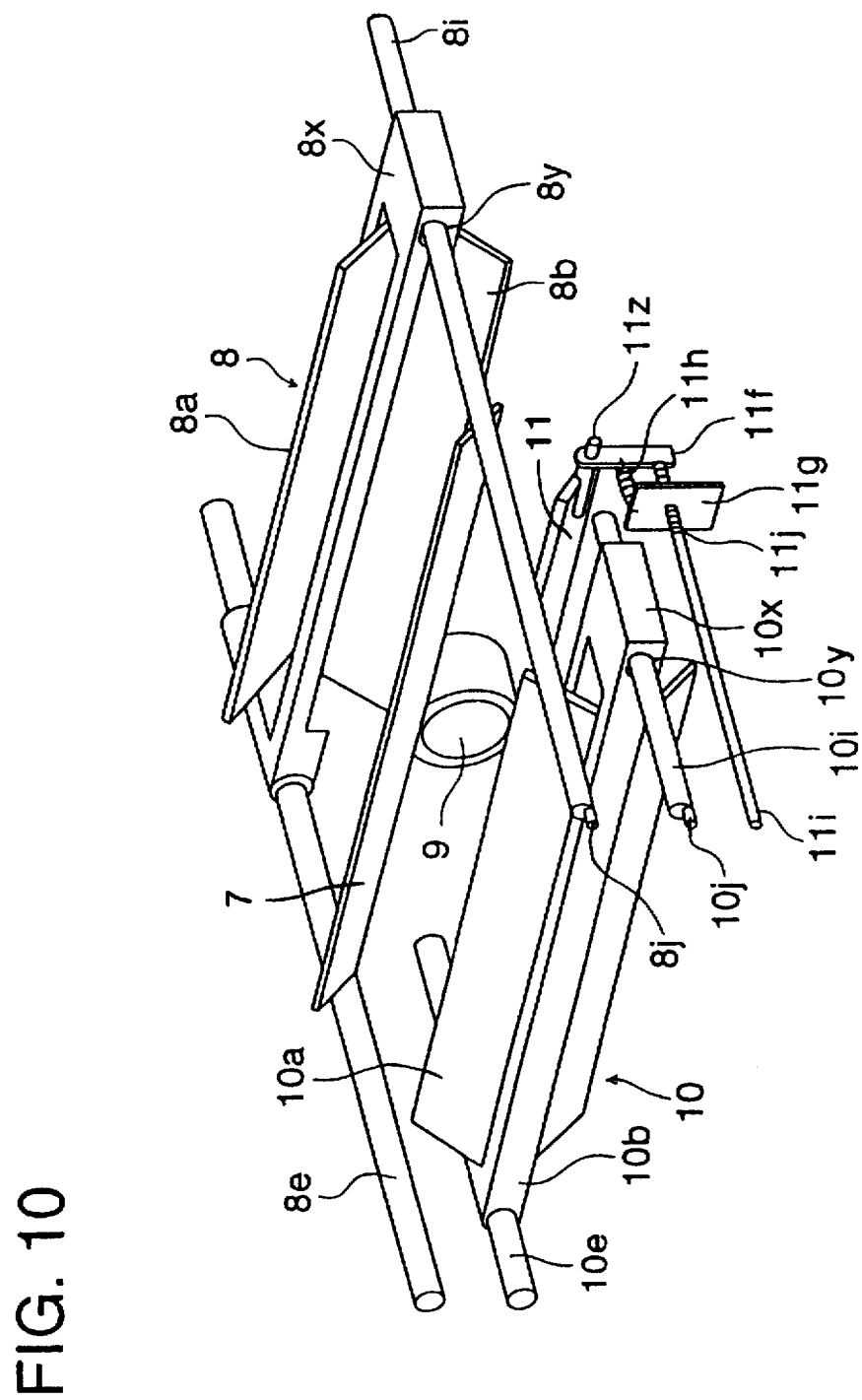
FIG. 10 is a schematic block diagram of another example of the optical system of the image forming apparatus.
Figure 11:
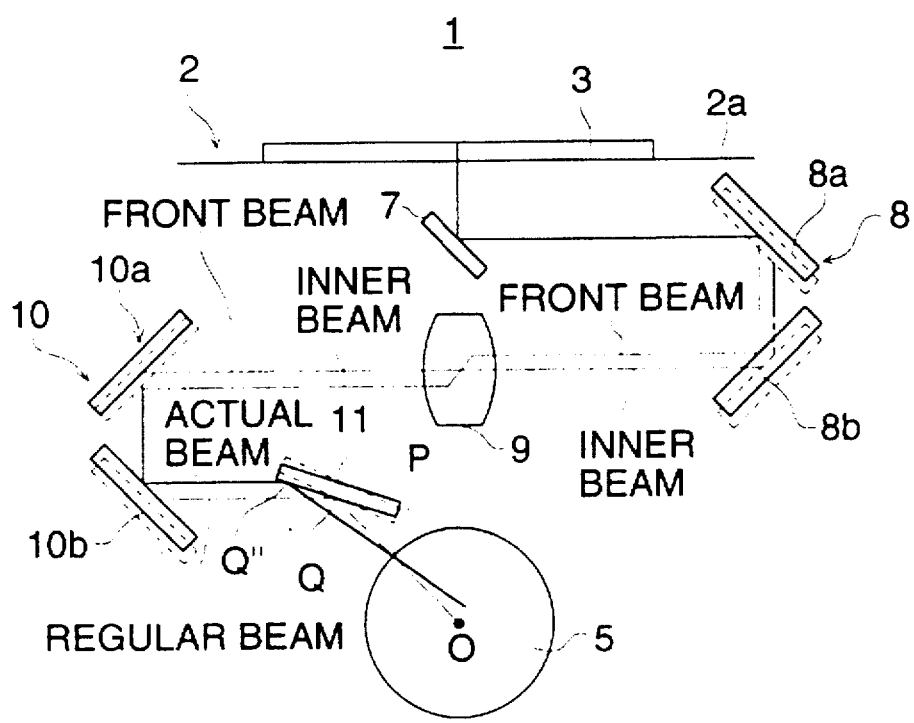
FIG. 11 is a drawing explaining the adjustment of the optical system described in claims 1 and 2.

FIG. 10 is a schematic block diagram of another example of the optical system in the image forming apparatus. In front side of retention materials 8x and 10x of first angled mirrors 8 and second angled mirrors 10, long holes 8y and 10y are formed as shown in FIG. 10. Through long holes 8y and 10y, shafts Ai and 10i are penetrated. At the end of shafts 8i and 10i, small-size dimension-eccentric shaft portion 8j and 10j are provided. By rotating shafts 8i and 10i with the shaft sections 8j and 10j as the center, the front edge portion of retention materials 8x and 10x moves upward and then downward. Following this, the front side of first angled mirror 8 and second angled mirror 10 also moves upward and downward.

Guide mirror 11 can be oscillated with fulcrum 11z as its center. On fulcrum 11z, adjustment plate 11f is fixed so that it is oscillated integrally with guide mirror 11. Supporting plate 11g is fixed onto the apparatus main body. At the center thereof, a female screw is provided. This screw biases adjustment plate 11f toward supporting plate 11g. Adjustment plate 11f is always brought into contact with the end portion of oscillating shaft 11i. Spring 11h is fixed to supporting plate 11g on one end and also fixed to adjustment plate 11f with the other end. With regard to oscillating shaft 11i for oscillating adjustment plate 11f, a male screw is provided at the end portion of 11j so that it is penetrated to the female screw on supporting plate 11g. If oscillating shaft 11i is rotated in the tightening direction, due to the above-mentioned mechanism, adjustment plate 11f rotates counterclockwise direction with fulcrum 11z as the center. Guide mirror 11 also rotates in the same direction.

As shown in this Example, shaft Ai and 10i are positioned relatively in the vicinity location as end portion of shaft sections 8j and 10j and oscillating shaft 11i. For example, if they are penetrated on holes provided on the same side plate of the main body, they can easily be adjusted from one side.

As described above, namely as shown in FIGS. 1 through 10, in the case of the first Example of the present invention, though there is no position shifting (namely, there is no distortion) in terms of forward/backward direction of the apparatus (the secondary scanning direction) on an image-forming position on drum-shaped image carrier 5, depending upon the combination of two sets of angled mirrors 8 and 10, there may be a case when the extended line of light emited from guide mirror does not pass the central axis of drum-shaped image carrier 5, i.e., the extended line of Q"P does not pass O (in the case of a belt-shaped image carrier, it corresponds to a case when an emited light does not incidence perpendicularly into an image carrier. In such an occasion, specifically, in the vicinity of the end portion of drum-shaped image carrier 5, a line which is perpendicular to the primary scanning direction, i.e., a line in the secondary scanning direction is obliquely image-formed so that image quality is deteriorated. Accordingly, due to combining of adjustment of height of two sets of angled mirrors 8 and 10 and adjustment of the angle of guide mirror 11, the above-mentioned problem can be overcome so that a favorable image having excellent reproducibility can be obtained and image quality at a position separated from an optical axis can be improved.

Figure 12:
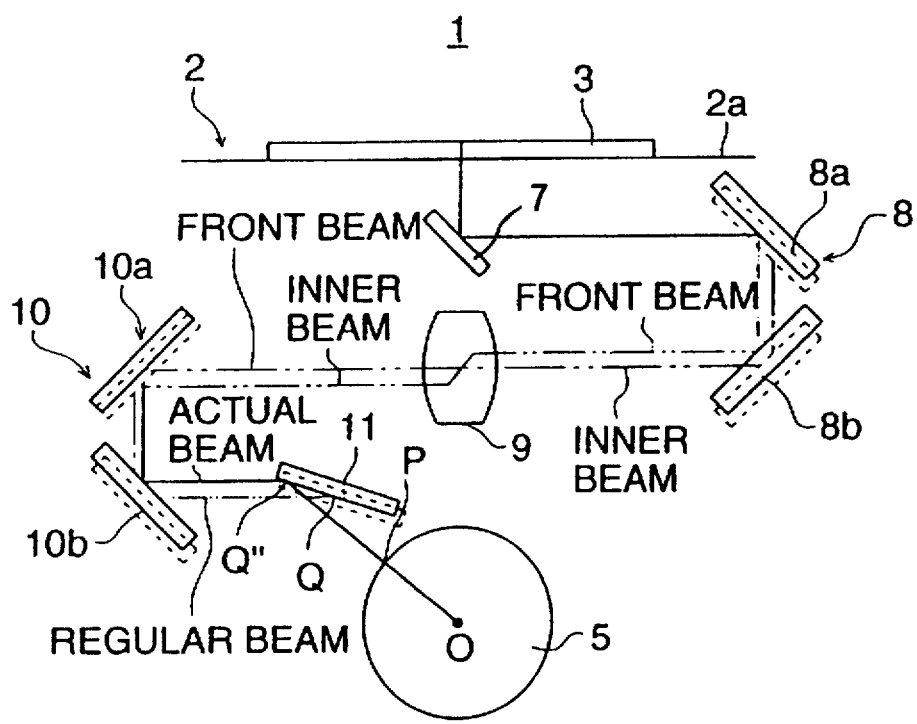
FIG. 12 is a drawing explaining the adjustment of the optical system described in claims 3 and 4.

As described in FIG. 12, the second example moves guide mirror 11 itself parallelly so that the rotation central axis O of the above-mentioned drum-shaped image carrier 5 can be located at the intersection point of the extended line of Q"P and beam from guide mirror 11 and thereby favorable image having excellent reproducibility can be obtained. Specifically, image quality at a position separated from the optical axis is improved.

Next, the second example of the present invention will be explained referring to FIGS. 12 through 18. As shown in FIG. 12, copying machine 1 as an image forming apparatus has original loading stand 2, image carrier 5, first mirror 7 which moves in the secondary scanning direction, first angled mirrors 8, which moves at speed lower than first mirror 7, constituted in such a manner that two reflection surfaces for re-reflecting reflected beam from first mirror 7 are approximately perpendicular each other, lens 9 for image-forming the reflected light from first angled mirrors 8, second angled mirror 10 constituted in such a manner that two reflection surfaces for re-reflecting the reflected beam from first mirror 8 are approximately perpendicular each other and guide mirror 11 which re-reflects beam from second angled mirror 10 and guides it to image carrier 5. At least one of two sets of angled mirrors 8 and 10 is rotatable with its one end or its vicinity as the center and the other end can be movable in a direction approximately perpendicular to original loading surface 2a. Guide mirror 11 can rotate in its reflected face with a line parallel in the primary scanning direction as the center, and concurrently with this, it can be moved while remaining parallel in the primary scanning direction of the central axis of said rotation. By moving the other end of angled mirrors 8 and 10 approximately perpendicular to original loading surface 2a, it causes to image-form a line parallel in the primary scanning direction on original loading surface 2 as a line parallel in the primary scanning direction on image carrier 5. By rotating guide mirror 11 and parallel movement of said rotation central axis, a line which is perpendicular to the primary scanning direction on original loading surface 2a is caused to image-form as a line perpendicular to the primary scanning direction on image carrier 5, and concurrently with this, a line parallel to the primary scanning direction on original loading surface 2a is caused to image-form on a intended position on image carrier 5.

As described above, though the present invention has no position shift (namely, distortion) with regard to the image-formation position on image carrier 5 on the forward/backward direction of the apparatus (the secondary scanning direction), depending upon the combination of two angled mirrors 8 and 10, the extended line of emited beam from guide mirror 11 may not pass through the central axis in the case of a drum-shaped image carrier. In such an occasion, in the vicinity of the end of image carrier 5, a line perpendicular to the primary scanning direction is obliquely image-formed, causing a problem that image quality is deteriorated. Therefore, a line parallel to the primary scanning direction on original loading surface 2a is image-formed as a line parallel to the primary scanning direction on image carrier 5 by moving the other end portion of angled mirrors 8 and 10 approximately perpendicular to original loading surface 2a, and a line perpendicular to the primary scanning direction on original loading surface 2a is image-formed as a line perpendicular to the primary scanning direction on image carrier 5 by the rotation of guide mirror 11 and parallel shift of aforesaid rotation central axis. Concurrently with the above, a line parallel to the primary scanning direction on the original loading surface is caused to image-form at a intended position on the image carrier, and distortion of image-formation and image shift can correctly be adjusted with a simple constitution.

Figure 13:
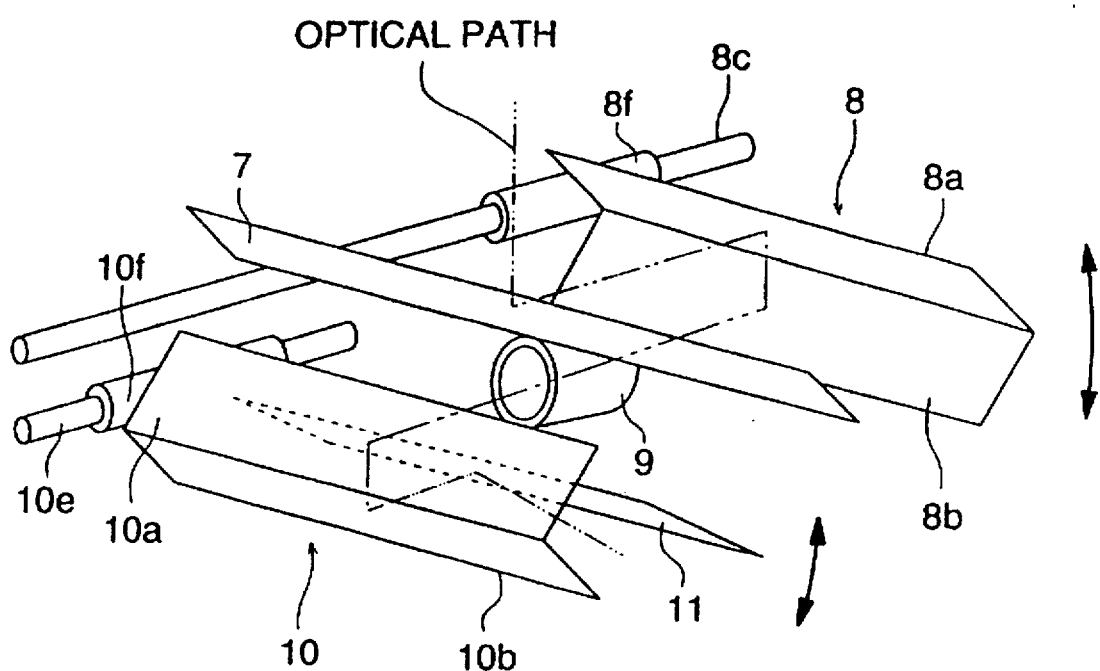
FIG. 13 is a schematic block diagram of the optical system of the image forming apparatus.

Hereinafter, referring to FIGS. 13 and 15, the present invention will be explained practically. In FIG. 13, by means of an optical system having 6 mirrors, at least one of angled mirrors 8 or 10 can be moved vertically in front of the apparatus as shown by the arrows. Position shifting (distortion) which occurs in the forward/backward direction (the secondary scanning direction) of the apparatus at an image-forming position on image carrier 5 is adjusted at first angled mirror 8 or second angled mirror 10.

Figure 14:
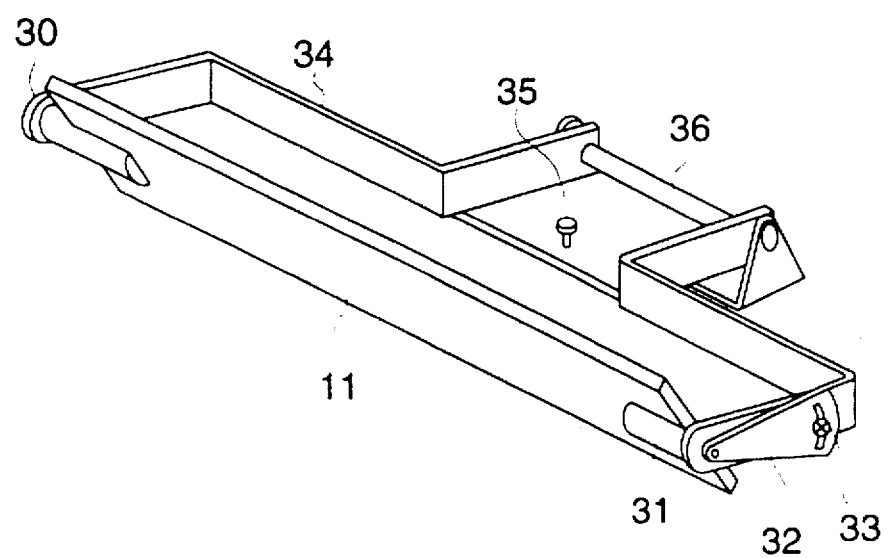
FIG. 14 is a perspective view of a retention mechanism.

Retention mechanism of guide mirror 11 is constituted as shown in FIG. 14. In FIG. 14, guide mirror 11 can be rotated about a line connecting fulcrums 30 and 31. The line connecting 30 and 31 is located on a reflected surface of guide mirror 11. Adjusting plate 32 rotates integrally with guide mirror 11. After adjustment, it is fixed to the retention mechanism with a supporting screw 33.

Retention mechanism 34 is used for parallel movement of the entire guide mirror 11. Turning adjusting screw 35 causes retention mechanism 34 to rotate about shaft 36 so that guide mirror 11 is moved vertically.

Figure 15:
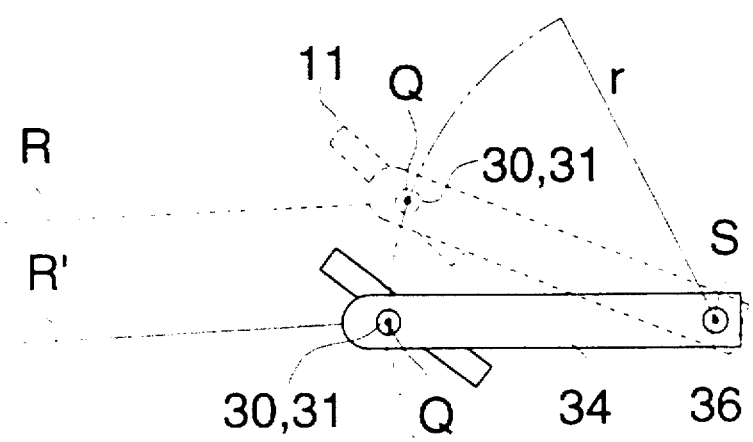
FIG. 15 is a drawing explaining the optical adjustment.
Figure 15:
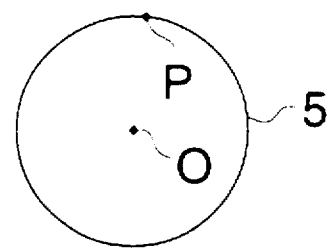

FIG. 15 is an explanation drawing of the effects of the present example. When actual optical path R' is, as shown by a continuous line, at a lower position compared to the intended optical path shown by the dashed line, guide mirror 11 is moved downward by rotating adjusting screw 35 so that the central axis of image carrier 5 is "O", the reflected point Q may be aligned on the intersection point of the line extended from OP and R.

In the above-mentioned occasion, the locus of the reflected point Q is an arc with the central point S as the center having a radius of r. However, if an adjustment region is set in the vicinity of the intersection point of aforesaid arc and a straight line OP, there is no practical interference.

Figure 16:
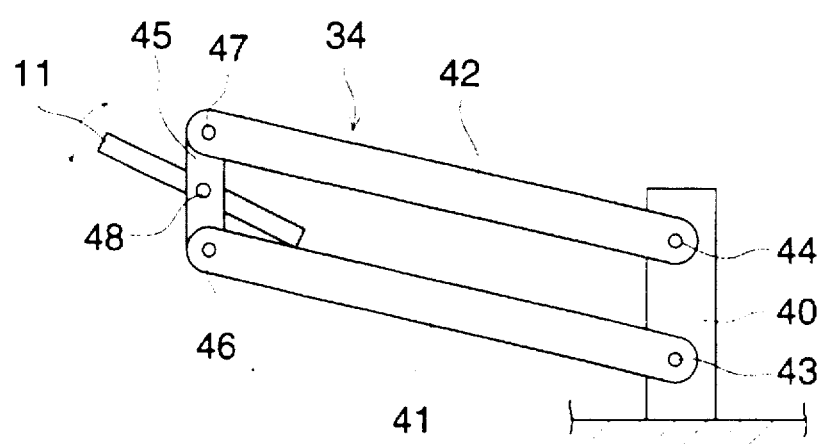
FIG. 16 is a drawing showing another example of a retention mechanism.

Constitution of retention mechanism 34 may also be set as shown in FIG. 16. In retention mechanism 34, the shifting member comprises supporting arms 41 and 42 are provided rotatably on support 40 with connection pins 43 and 44 as fulcrums. The front edge of supporting arms 41 and 42 are provided wherein connection arm 45 is rotatably with connection pins 46 and 47 as fulcrums. On connection arm 45, guide mirror 11 is rotatable in an arrowed direction with supporting pin 48 as a fulcrum. Due to this, change of angle of guide mirror 11 following oscillation of retention mechanism 34 can be prevented.

Figure 17:
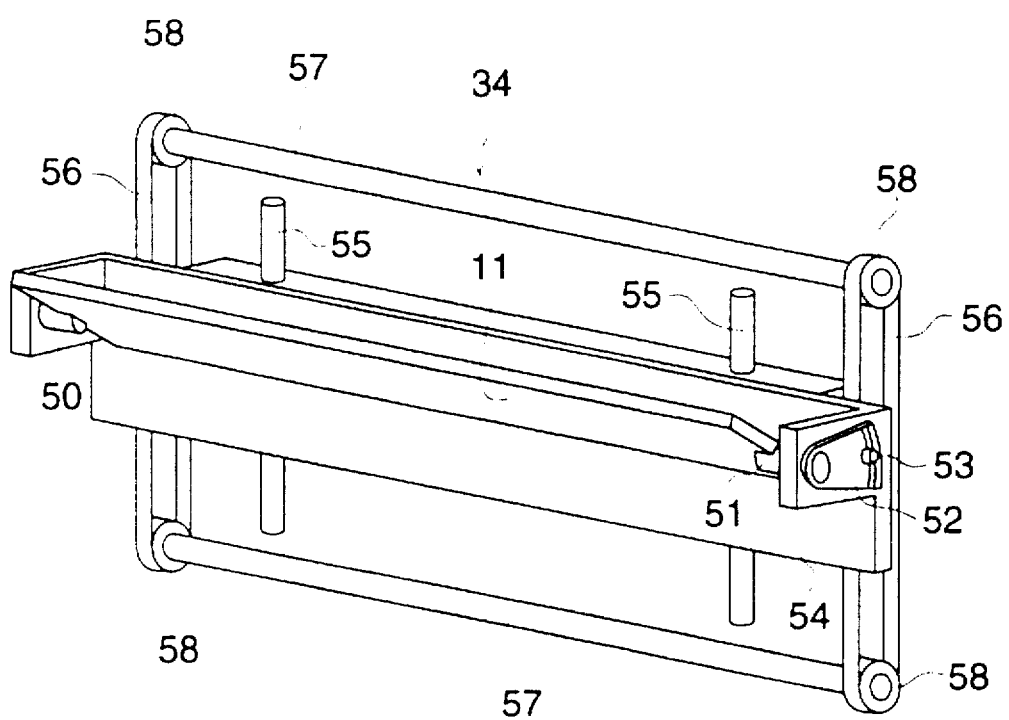
FIG. 17 is a drawing showing still another example of a retention mechanism.

Retention mechanism 34 of guide mirror 11 can be constituted as shown in FIG. 17. Portions are common to FIG. 13 are omitted. Guide mirror 11 can be rotated with a line connecting fulcrums 50 and 51 as the center. Adjusting plate 52 is rotated integrally with guide mirror 11 to be adjusted. After completion of adjustment, it is fixed on retention member 54 with supporting screw 53, and moves vertically along paired guiding shafts 55. Both ends of retention member 54 are respectively fixed to belts 56. Aforesaid belt 56 are mounted on pulleys 58 provided on upper and lower shafts 57.

In order to move guide mirror 11 parallel, retention member 54 may be moved vertically by manual or vertical force may be added to retention member 54 using a screw or a cam mechanism not illustrated. If a mechanism shown in FIG. 17 is employed, both end portions of retention member 54 are moved synchronously due to a mechanism comprised of belt 56 and pulley 58. Therefore, no difference in height in the primary scanning direction of retention mechanism 34 occurs, nor movement lacks smoothness. When applying aforesaid mechanism to an actual apparatus, adjustment of the change of angle of guide mirror 11 is easy if guiding shaft 55 is set to be parallel with a straight line OP. In addition, in the case of the belt-shaped image carrier, guide mirror 11 is set perpendicularly to the image carrier.

Figure 18:
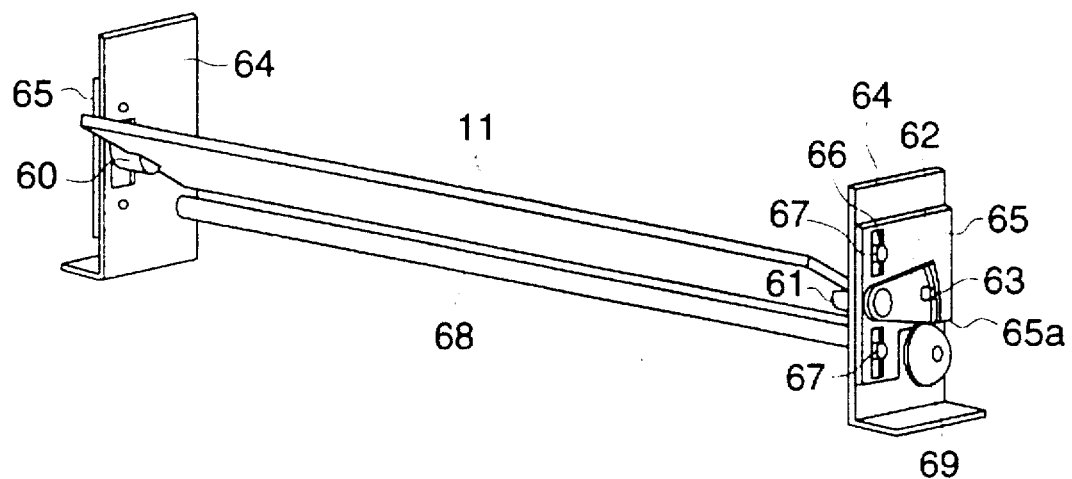
FIG. 18 is a drawing showing yet still another example of a retention mechanism.

Retention mechanism 34 of guide mirror 11 can also be constituted as shown in FIG. 18. Portions common to FIG. 13 are omitted. Guide mirror 11 can be rotated with a line connecting fulcrums 60 and 61 as the center. Adjusting plate 62 is rotated integrally with guide mirror 11 to be adjusted. After completion of adjustment, it is fixed on paired supporting plate 64 with supporting screws 63. On each supporting plate 64, movable plate 65 is movable perpendicularly due to the engagement of long hole 66 extending vertically and guide pins 67 provided on supporting plate 64. On holes provided on paired supporting plate 64, shaft 68 is penetrated to be supported rotatably, and eccentric cams 69 are fixed at both ends.

Eccentric cams 69 are brought into contact with end surface 65a of movable plate 65. Due to biasing means such as springs not illustrated, movable plate 65 is provided with pressure force against eccentric cam 69. By rotating shaft 68, eccentric cam 69 also rotates and movable plates 65 conducts parallel movement vertically. Accordingly, guide mirror 11 also moves vertically. Movement direction of movable plate 65 is set in the same manner as in FIG. 17.

As described above, one end of the first angled mirrors and the second angled mirror is caused to move approximately vertically against the original loading surface so that a line parallel to the primary scanning direction is adjusted. Next, the guide mirror is caused to rotate so that a line parallel to the secondary scanning direction is adjusted. Position shifting of a line parallel to the primary scanning direction caused by adjustment of aforesaid guide mirror by rotation is adjusted by moving one end of the first angled mirrors and one end of the second angled mirror approximately vertically to the original loading surface. A line parallel to the primary scanning direction on the original loading surface and a line parallel to the secondary scanning direction on the original loading surface are respectively image-formed as a line parallel to the primary scanning direction and a line parallel to the secondary scanning direction on a intended exposure position on the image carrier. Accordingly, with a simple constitution, distortion of image-formation and image shifting can be correctly adjusted so that a favorable image having high reproducibility is obtained. Specifically, image quality at a position separated from the optical axis can be improved.

According to the second example of the present invention, by moving the other end of the angled mirror approximately vertically against the original loading surface, a line parallel in the primary scanning direction is caused to image-form as a line parallel in the primary scanning direction on the image carrier. Due to rotation of the guide mirror and parallel movement of the central axis of aforesaid rotation, a line perpendicular to the primary scanning direction on the original loading surface is caused to image-form as a line perpendicular to the primary scanning direction on the image carrier. Concurrently with this, a line parallel to the primary scanning direction on the original loading surface is caused to image-form on an intended position on the image carrier. Accordingly, with a simple constitution, distortion and position shifting of image-formation can correctly be adjusted so that an image with favorable quality having high reproducibility is obtained. Specifically, image quality at a position separated from the optical axis can be improved.

What is claimed is:

1. A device for adjusting an optical system for use in an image forming apparatus having a platen on which an original sheet is irradiated along a scanning line so as to produce a line-shaped image light and a photoreceptor on which a line image corresponding to the line-shaped image light is formed by the optical system, wherein the optical system comprises a scanning mirror, a first V-mirror, a second V-mirror and a guide mirror each of which has a length corresponding to the scanning line and located parallel to the scanning line and wherein the optical system is arranged so that the scanning mirror is moved in a direction perpendicular to the scanning line to reflect a line-shaped image light line by line, the first V-mirror is moved in synchronization with the scanning mirror and changes a direction of the line-shaped image light reflected from the scanning mirror toward a lens, the second V-mirror changes a direction of the line shaped image light coming from the lens toward the guide mirror, and the guide mirror projects the line-shaped image light onto the photoreceptor, the device comprising:

an actuator for changing positions of at least two of the first V-mirror, the second V-mirror and the guide mirror so as to place the line-shaped image light at a predetermined position on the photoreceptor; and a regulator for adjusting a tilting angle of the guide mirror so as to set an incident angle of the line-shaped image light on the photoreceptor at a predetermined angle.

2. The device of claim 1, wherein each mirror has A-side corresponding to one end of the scanning line and B-side corresponding to the other end of the scanning line.

3. The device of claim 2, wherein when the actuator changes the positions of the first V-mirror and second V-mirror, the actuator is structured in such that the A-side of each of the first V-mirror and the second V-mirror is fixed so as to form an axis and an adjusting member is provided to the B-side of each of the first V-mirror and the second V-mirror so that the B-side of each of the first V-mirror and the second V-mirror is turned upward or downward independently around the axis of the corresponding A-side.

4. The device of claim 3, wherein the adjusting member is a adjusting screw.

5. The device of claim 2, wherein when the actuator changes the positions of one of the first V-mirror and the second V-mirror and the guide mirror, the actuator is structured in such that the A-side of the changed V-mirror is fixed so as to form an axis, an adjusting member is provided to the B-side of the changed V-mirror so that the changed V-mirror is turned upward or downward around the axis and a shifting member is provided to the guide mirror so that the guide mirror is shifted while both the A side and the B-side of the guide mirror are kept at the same level.

6. The device of claim 5, wherein the adjusting member is a shaft having an eccentric axis so that the shaft turns the changed V-mirror upward or downward when the shaft is rotated around the eccentric axis.

7. The device of claim 1, wherein the guide mirror is provided with a rotation axis parallel to the scanning line and the guide mirror is rotated around the rotation axis.

8. The device of claim 1, wherein the line image comprises a line to be placed parallel to the scanning line and a line to be placed perpendicular to the scanning line.

9. A method of adjusting an optical system for use in an image forming apparatus having a platen on which an original sheet is irradiated along a scanning line so as to produce a line-shaped image light and a photoreceptor on which a line-shaped image corresponding to the line-shaped image light is formed by the optical system, wherein the optical system comprises a scanning mirror, a first V-mirror, a second V-mirror and a guide mirror each of which has a length corresponding to the scanning line and located parallel to the scanning line and wherein the optical system is arranged so that the scanning mirror is moved in a direction perpendicular to the scanning line to reflect a line-shaped image light line by line, the first V-mirror is moved in synchronization with the scanning mirror and changes a direction of the line-shaped image light reflected from the scanning mirror toward a lens, the second V-mirror changes a direction of the line shaped image light coming from the lens toward the guide mirror, and the guide mirror projects the line-shaped image light onto the photoreceptor, the method comprising:

changing positions of at least two of the first V-mirror, the second V-mirror and the guide mirror so as to place the line-shaped image light at a predetermined position on the photoreceptor; and regulating a tilting angle of the guide mirror so as to set an incident angle of the image light to a predetermined angle.

10. The method of claim 9, wherein each mirror has A-side corresponding to one end of the scanning line and B-side corresponding to the other end of the scanning line.

11. The method of claim 10, wherein when the positions of the first V-mirror and second V-mirror are changed, the A-side of each of the first V-mirror and the second V-mirror is fixed so as to form an axis and the B-side of each of the first V-mirror and the second V-mirror is turned upward or downward independently around the corresponding axis.

12. The method of claim 10, wherein when the position of one of the first V-mirror and the second V-mirror and the position of the guide mirror are changed, the A-side of the changed V-mirror is fixed so as to form an axis and the B-side of the changed V-mirror is turned upward or downward around the axis and the guide mirror is shifted while both the A side and the B-side of the guide mirror are kept at the same level.

* * * * *